(12) United States Patent
Schofield (10) Patent No.: US 12,467,213 B2
(45) Date of Patent: Nov. 11, 2025

(54) STRAPPING APPARATUS

(71) Applicant: THREE SMITH GROUP LIMIITED, West Yorkshire (GB)

(72) Inventor: Dale Schofield, West Yorkshire (GB)

(73) Assignee: THREE SMITH GROUP LIMITED, West Yorkshire (GB)

( * ) Notice: Subject to any disclaimer, the term of this patent is extended or adjusted under 35 U.S.C. 154(b) by 469 days.

(21) Appl. No.: 17/784,703

(22) PCT Filed: Dec. 8, 2020

(86) PCT No.: PCT/GB2020/053139
§ 371 (c)(1),
(2) Date: Jun. 13, 2022

(87) PCT Pub. No.: WO2021/116669
PCT Pub. Date: Jun. 17, 2021

(65) Prior Publication Data
US 2023/0058844 A1  Feb. 23, 2023

(30) Foreign Application Priority Data
Dec. 13, 2019  (GB) .................................... 1918407

(51) Int. Cl.
*E01F 15/04* (2006.01)
*E06B 11/02* (2006.01)
*F16B 2/08* (2006.01)

(52) U.S. Cl.
CPC ...... *E01F 15/0438* (2013.01); *E01F 15/0461* (2013.01); *E06B 11/02* (2013.01); *F16B 2/08* (2013.01)

(58) Field of Classification Search
CPC ..... G09F 2007/1804; G09F 2007/1817; F16B 2/08; E01F 15/0438; E01F 15/0461
See application file for complete search history.

(56) References Cited

U.S. PATENT DOCUMENTS

| | | | |
|---|---|---|---|
| 1,808,196 | A | 6/1931 | Williams |
| 2,970,799 | A | 2/1961 | Pinson |
| 3,241,800 | A | 3/1966 | Richter, III |
| (Continued) | | | |

FOREIGN PATENT DOCUMENTS

| | | | |
|---|---|---|---|
| CN | 202972214 U | 6/2013 | |
| CN | 203974660 U | 12/2014 | |
| (Continued) | | | |

OTHER PUBLICATIONS

English Translation of Jul. 18, 2023 Office Action issued in Japanese Patent Application No. 2022-535519.
(Continued)

*Primary Examiner* — Jonathan P Masinick
(74) *Attorney, Agent, or Firm* — Oliff PLC (57) ABSTRACT

A strapping apparatus for coupling an article to a post, the apparatus including a post adapter including a first side configured to engage with the post and a second side comprising a recess; a retaining element at least partially located in the recess of the post adapter; and a strap configured to extend around the post, the strap including: a first end configured to be removably coupled to post adapter; and a second end configured to be received in the retaining element.

12 Claims, 11 Drawing Sheets

(56) References Cited

U.S. PATENT DOCUMENTS

| | | | |
|---|---|---|---|
| 4,254,568 A * | 3/1981 | Ranalli | G09B 29/06 |
| | | | 40/518 |
| 4,325,529 A * | 4/1982 | Seebinger | F16B 2/08 |
| | | | 248/219.4 |
| 4,460,142 A | 7/1984 | O'Rorke | |
| 5,567,084 A * | 10/1996 | Oliver | B63C 11/2245 |
| | | | 256/32 |
| 5,645,255 A | 7/1997 | Parduhn | |
| 6,179,273 B1 * | 1/2001 | Edmunds, III | E01F 15/0438 |
| | | | 404/6 |
| 6,338,212 B1 * | 1/2002 | Santa Cruz | G09F 17/00 |
| | | | 40/611.05 |
| 6,357,709 B1 | 3/2002 | Parduhn | |
| 7,997,546 B1 | 8/2011 | Andersen et al. | |
| 9,200,654 B1 | 12/2015 | Parduhn | |
| 10,428,558 B2 * | 10/2019 | Hall | F16B 1/02 |
| 10,522,059 B1 * | 12/2019 | Greilanger | G09F 7/18 |
| 10,568,636 B2 * | 2/2020 | Demas | A61B 17/1327 |
| 10,717,507 B2 * | 7/2020 | Stella | F16B 2/08 |
| 10,892,793 B2 * | 1/2021 | Goodfellow | H04B 1/3888 |
| 11,221,102 B2 * | 1/2022 | Palanisamy | F16B 2/08 |
| 2012/0001041 A1 | 1/2012 | Yang et al. | |
| 2015/0026935 A1 | 1/2015 | Prescott | |
| 2015/0354766 A1 | 12/2015 | Townsend, Jr. | |
| 2018/0045366 A1 * | 2/2018 | Perez | F16B 2/185 |
| 2019/0322223 A1 * | 10/2019 | Hancock | F16B 2/08 |
| 2020/0192441 A1 * | 6/2020 | Saravis | H05K 7/20172 |

FOREIGN PATENT DOCUMENTS

| | | | | |
|---|---|---|---|---|
| DE | 2412058 A1 * | 9/1975 | | |
| DE | 4304239 A1 * | 8/1994 | | B62J 11/00 |
| DE | 102012109241 A1 * | 6/2014 | | B60N 3/103 |
| DE | 102015016724 A1 * | 6/2017 | | |
| EP | 1 227 457 A2 | 7/2002 | | |
| EP | 2 653 072 A2 | 10/2013 | | |
| GB | 1319579 A * | 6/1973 | | |
| JP | S57-171482 U | 10/1982 | | |
| JP | 2016-008997 A | 1/2016 | | |
| JP | 2016-513449 A | 5/2016 | | |
| JP | 2017-509811 A | 4/2017 | | |
| JP | 2017-206273 A | 11/2017 | | |
| KR | 20-0282157 Y1 | 7/2002 | | |
| KR | 20-0433782 Y1 | 12/2006 | | |
| KR | 101006130 B1 * | 1/2011 | | |
| KR | 10-2012-0133122 A | 12/2012 | | |
| WO | 2010/061175 A1 | 6/2010 | | |

OTHER PUBLICATIONS

Translation of Sep. 8, 2023 Office Action Issued in Korean Patent Application No. 10-2022-7023876.

Feb. 22, 2021 International Search Report issued in International Patent Application No. PCT/GB2020/053139.

Jan. 16, 2024 Office Action issued in Japanese Patent Application No. 2022-535519.

* cited by examiner

STRAPPING APPARATUS

The present disclosure relates to a strapping apparatus, and in particular to a strapping apparatus for coupling an article, such as a barrier to a post.

BACKGROUND

It is known to provide barriers and gates to protect equipment and demarcate areas. Such barriers and gates may be used to demarcate a path for pedestrians or motorists and/or prevent a vehicle colliding with equipment which can, for instance, cause damage to the equipment.

Gates can provide access to areas that are of interest, for example, areas in a factory that house equipment. In some examples, gates are provided between two posts and can be rotatably coupled to one of the posts.

Typically, barriers and gates are permanently fixed to posts such that they are not removed after they have been fixed. Further, barriers or gates will often require separate fixtures to attach them to posts. In practice, these separate fixtures may require a number of different parts and may be lost in use. Further, using these fixtures means that once a barrier has been attached to a post, it can be a complicated process to subsequently remove it.

In addition, over time the requirement for the fixtures and fittings of an office or factory changes. As such, there is a need to provide an easy method for mounting different types of articles to a post.

It is an aim of the present invention to attempt to overcome at least one of the above or other disadvantages

SUMMARY

According to the present disclosure there is provided a strapping apparatus as set forth in the appended claims. Other features of the invention will be apparent from the dependent claims, and the description which follows.

According to a first aspect, there is provided a strapping apparatus for coupling an article to a post. The apparatus comprises a post adapter comprising a first side configured to engage with said post and a second side comprising a recess; a retaining element at least partially located in the recess of the post adapter; and a strap configured to extend around said post, the strap comprising: a first end configured to be removably coupled to post adapter; and a second end configured to be received in the retaining element, wherein in use, the retaining element in the recess of the post adapter is configured to be substantially covered by said article.

The provision of a strapping apparatus with the features described above means that there is a mechanism for quickly and efficiently securing an article, such as a barrier to a post. Importantly, no tools are required for erecting the strapping apparatus and so the strapping apparatus can be easily and quickly used to mount an article to a post by any user. Avoiding the need for additional tools means significantly reduces the complexity of mounting an article to a post.

The first end of the strap may removably coupled to a fixture location in the recess of the post adapter.

The first end of the strap may comprise a protrusion configured to be received in a slotted channel in a catch of the post adapter.

In one example, the retaining element comprises a buckle.

The buckle may comprise a retaining portion configured to be received in a complimentary shaped portion of the recess of the post adapter.

The second end of the strap may comprise one or more ridges.

The retaining element may comprise a latch configured to engage with the one or more ridges of the strap.

The provision of a latch that engages with the one or more ridges of the straps increases the friction between the latch and the straps and so provides a resilient coupling.

In one example, the strap comprises a twin shot material.

In one example, the first side of the post adapter is substantially concave.

The strapping apparatus may include an insert configured to be located between the post adapter and said post, the insert comprising: a first, substantially convex, side configured to abut the first side of the post adapter; and a second substantially concave side configured to abut said post, wherein the first side and second sides of the insert have different curvatures.

The strapping apparatus may include one or more channels in the post adapter configure to receive the strap.

The strapping apparatus may include a plurality of straps.

The strapping apparatus may include an article that is is configured to substantially cover the retaining element in the recess of the post adapter. Providing an article that substantially covers the retaining element in the recess of the post adapter means that the safety of the strapping apparatus is increased as it would be harder for a user to accidently knock the retaining element.

According to one aspect, there is provided a system comprising: the strapping apparatus as described above; and the article configured to substantially cover the retaining element in the recess of the post adapter.

The article may comprise a barrier member.

According to one aspect, there is provided a barrier system comprising: a barrier member; a post adapter configured to engage with the barrier member and a post, the post adapter comprising a strap configured to extend around a post to couple the barrier system to the post.

According to one aspect, there is provided a method of attaching a strapping apparatus to a post, the method comprising: removably coupling a first end of a strap to a fixture location in a recess of a post adapter; and strapping the strap around the post and placing the second end of the strap into a retaining element in the recess of the post adapter. The method comprises the steps of coupling an article to the post adapter, wherein the article substantially covers the retaining element in the recess of the post adapter.

BRIEF DESCRIPTION OF THE DRAWINGS

Examples of the present disclosure will now be described with reference to the accompanying drawings.

DETAILED DESCRIPTION

The present disclosure relates to a strapping apparatus. In particularly, the strapping apparatus is for connecting an article, such as a barrier or a gate to a permanent fixture, such as a post. The strapping apparatus includes a post adapter configured to engage with the post, and a strap configured to extend around the post and be coupled with the post adapter.

The post adapter includes a first side which is configured to engage with a post and a second side, which is configured to engage with an article, such as a barrier. For example, the second side of the post adaptor may have an interface such that an article, such as a barrier or gate, may be coupled.

The strap is configured to be engaged with the post adapter, for example, in slots within the post adapter. The strap will extend from the post adapter from the first side to extend around a post in use. The post adapter includes a recess located in the second side of the post adapter. In other words, the post adapter includes a recess in the face of the post adapter between the post adapter and the article.

The strapping apparatus also includes a retaining element configured to retain the strap, in use. The retaining element may be located within the recess of the post adapter. The first end of the strap may be removably coupled to a fixture point within the recess of the post adapter. The second end of the strap may be removably coupled to a retaining element, which may be located in the recess of the post adapter.

Figure 1:
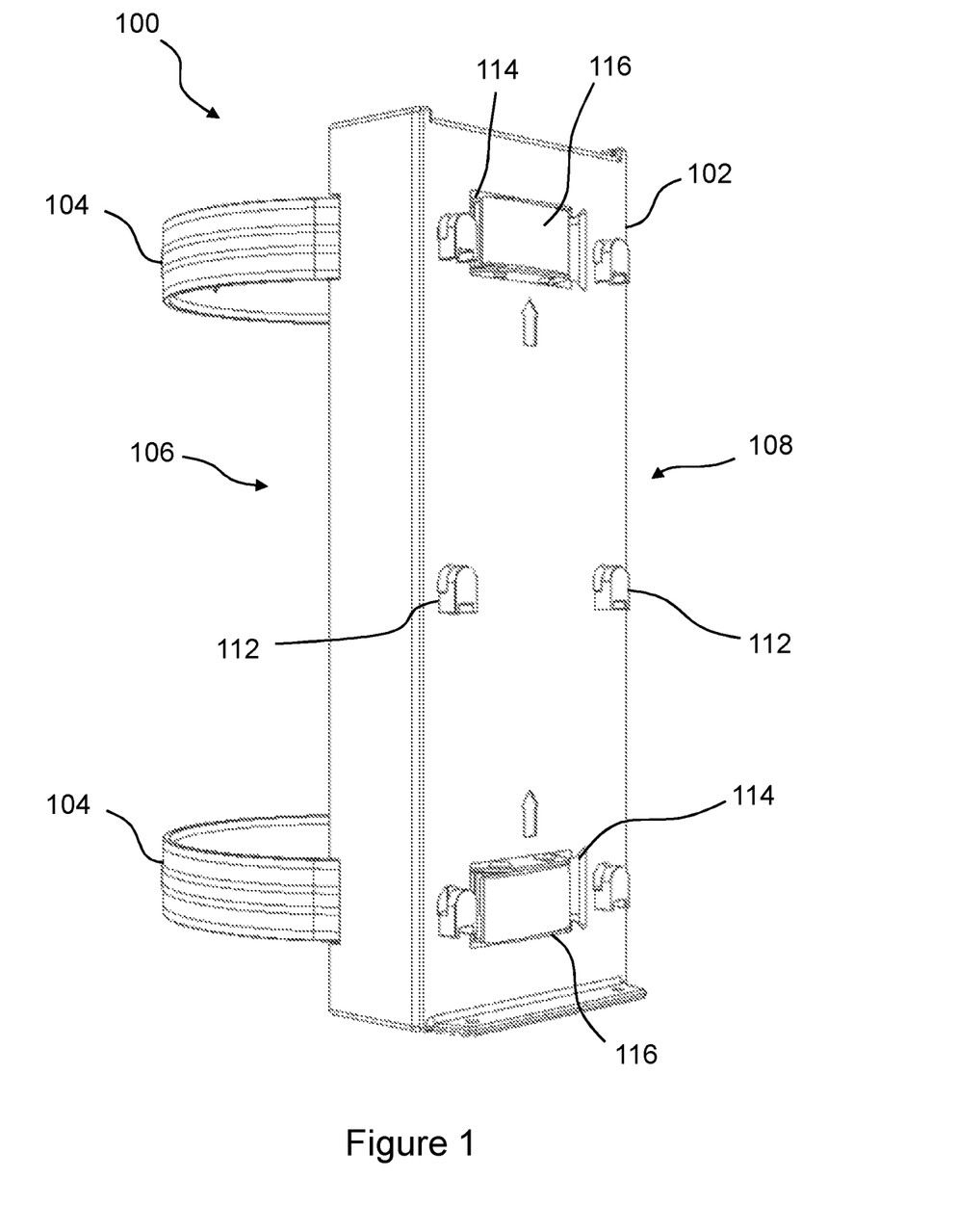
FIG. 1 shows an example of a strapping apparatus.

FIG. 1 shows an example of a strapping apparatus 100. The strapping apparatus 100 includes a post adapter 102 and a strap 104 configured to engage with the post adapter 102.

The post adapter 102 includes a first side 106 configured to engage with a post (not shown) and a second side 108 configured to be coupled to an article, such as a barrier or gate (not shown).

The first side 106 of the post adapter 102 may be curved such that it is shaped abut with a cylindrical post. In other words, the first side 106 of the post adapter 102 may be substantially concave. The first side 106 is substantially opposite to the second side 108 of the post adapter 102. In other examples, the first side 106 of the post 102 may have an orthogonal profile so as to couple with a post that has a polygonal cross-section.

The second side 108 of the post adapter 102 may be substantially planar. In one example, the post adapter 102 comprises one or more coupling points 112 or protrusions that enable an article, such as a barrier or gate to be removably attached to the post adaptor 102. For example, the barrier or gate may comprise corresponding coupling points, such as recesses or hooks, in corresponding positions with the coupling points 112 of the post adapter 102.

The post adapter 102 comprises one or more recesses 114. The recess 114 is configured to receive a retaining element 116 of the strapping apparatus 100. The retaining element 116 is at least partially received in the recess 114 of the post adapter 102.

In one example, the recess 114 is also configured to receive the first end of the strap 104. The second end of the strap may be removably received in the retaining element 116, as described in more detail below.

Figure 2:
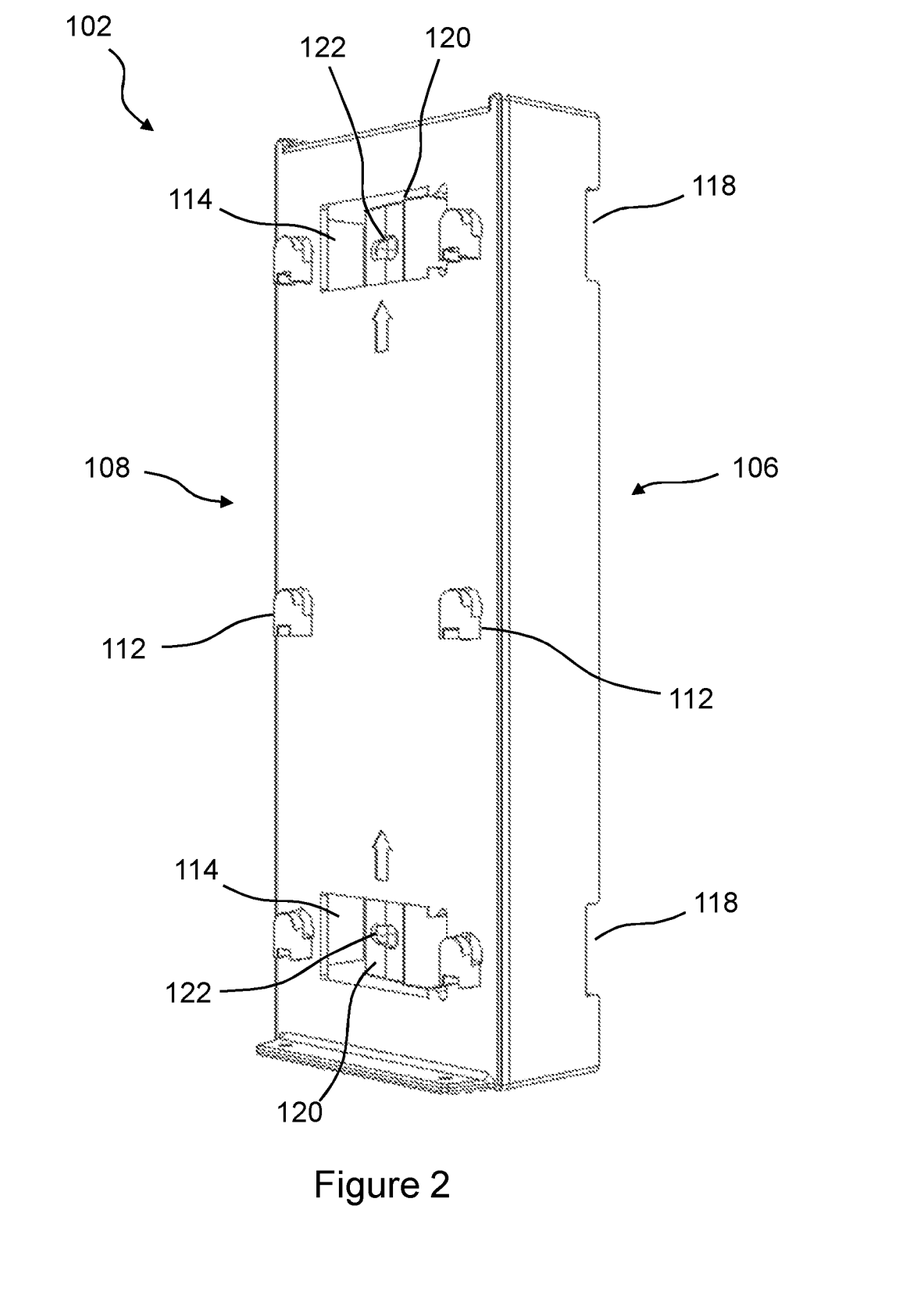
FIG. 2 shows an example of a post adapter from a first view.

FIG. 2 shows an example of the post adapter 102 in which the straps 104 have been removed. The post adapter 102 in FIG. 2 is shown in a rotated perspective relative to FIG. 1. In FIG. 2, a plurality of recesses 114 are shown for receiving a plurality of straps 104. However, in other example, only one recess 114 is provided in the post adapter 102. The recess 114 is an opening or apertures within the second side 108 of the post adapter 102.

In one example, the post adapter 102 comprises a top recess 114 for receiving a top strap 104 and a bottom recess 114 for receiving a bottom strap 104.

Figure 3A:
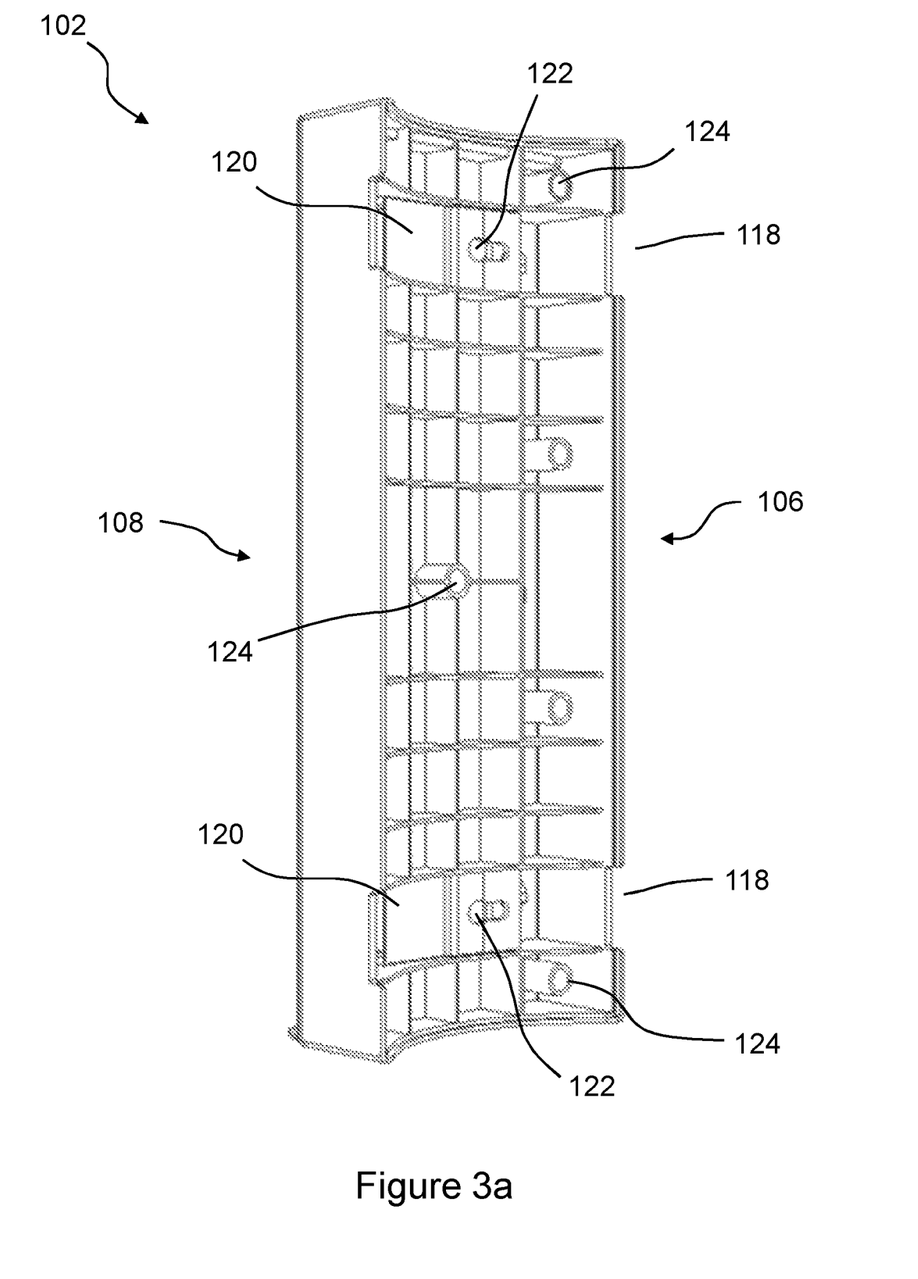
FIG. 3*a* shows an example of a post adapter from a second view.

An outline of a channel 118 in the first side 106 of the post adapter 102 are shown in FIG. 2. These are shown in more detail in FIG. 3. The channel 118 may be a guide in the post adapter 102 that is configured to allow the strap 104 to access the recess 114 in the second side 108 of the post adapter 102. The channel 118 need not necessarily be totally enclosed by the post adapter 102, but rather may just be a groove in the post adapter 102.

As shown in FIG. 2, the post adapter 102 may comprise a catch 120. The catch 120 is located within the recess 114 of the post adapter 102 and accessible from both the first side 106 and the second side 108 of the post adapter 102 when the post adapter 102 is not connected to the post or the article. The catch 120 may comprise a resilient member to which the strap 102 may be attached.

In one example, the catch 120 comprises a fixture location for coupling with the strap 104. For example, the catch 120 may comprise a slotted opening 122 to receive a projection or coupling point of the first end of the strap 104. The coupling point or projection is shown in more detail in FIG. 4.

In one example, the slotted opening 122 has a first opening with a relatively larger dimension with a slotted portion adjacent to the first opening with a relatively smaller dimension. The projection from the first end of the strap 102 may comprise a head portion and a neck. The head portion has a relatively larger size compared with the neck. In other words, the projection may be shaped such that it can be passed through the larger first opening within the slotted opening 122. The neck of the projection may be able to slide within the slotted portion and in this example, the head of the projection has a relatively larger size compared with the size of the slotted portion such that it is resiliently held in place.

FIG. 3a shows an example of the post adapter 102 in which the straps 104 have been removed. The post adapter 102 in FIG. 3a is shown in a rotated perspective relative to FIG. 2.

The catch 120 of the post adapter 102 is shown from another perspective in FIG. 3a compared to FIG. 2. The post adapter 102 includes one or more insert attachment points 124. These insert attachment points 124 are configured to receive one or more attachments of inserts (shown in more detail in FIG. 3b).

As shown in FIG. 3a, the first side 106 of the post adapter 102 may have a substantially concave shape such that it can engage with and abut against a cylindrical post, in use. In other words, the first side 106 of the post adapter 102 may be shaped such that substantially all of the first side 106 of the post adaptor is configured to abut a cylindrical post in use. In one example, the first side 106 of the post adapter 102 is shaped to substantially engage with a post in a flush manner. In one example, the first side 106 of the post adapter 102 is shaped to substantially engage with a 130 mm cylindrical post in a flush manner.

Figure 3B:
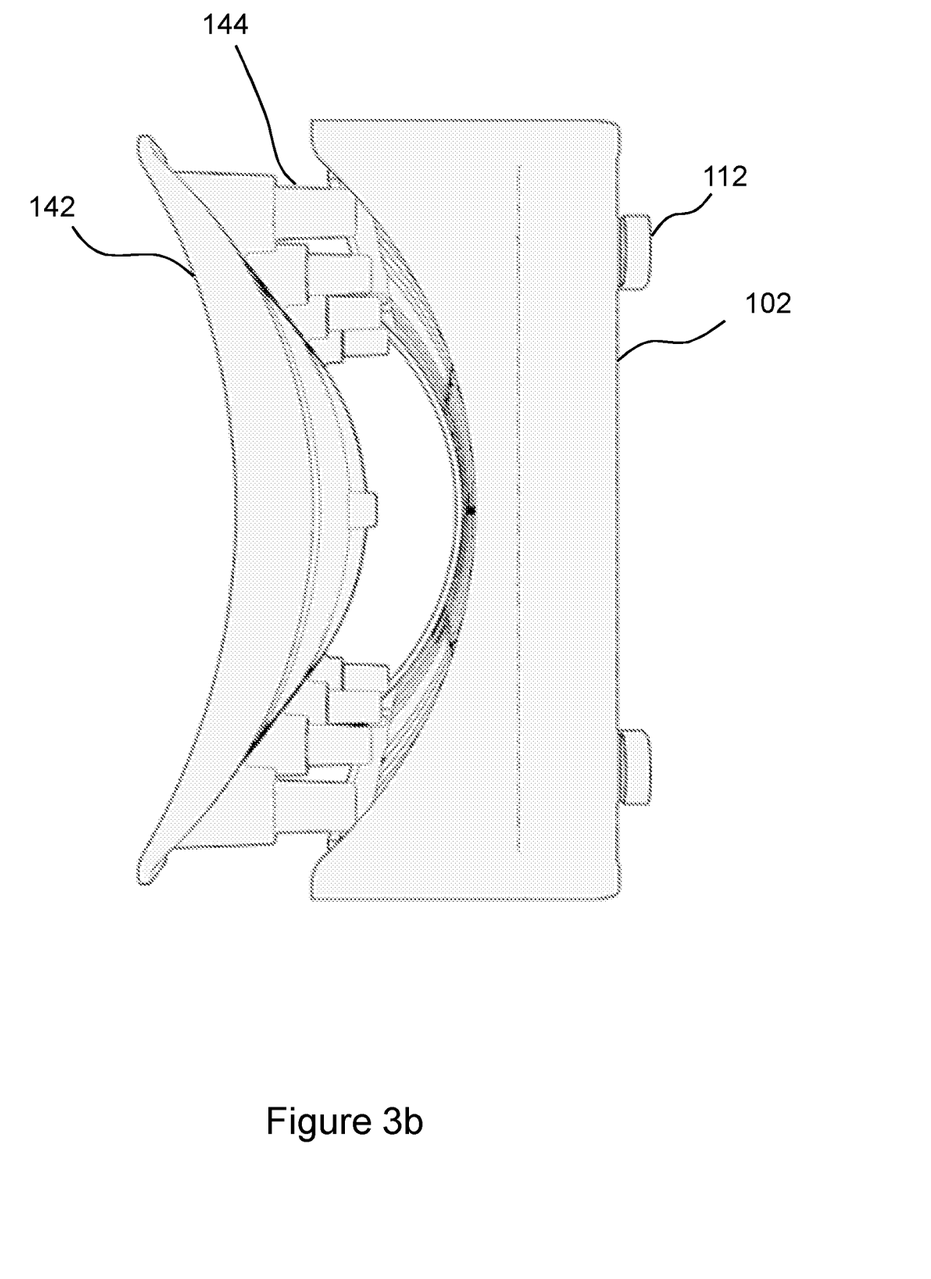
FIG. 3*b* shows an example of an insert and a post adapter.

FIG. 3b shows an example of a post adapter 102 with an insert 142 coupled with the second side of the post adapter 102. The insert 142 is sized such that one side of the insert may abut the post adapter 102 in a substantially flush arrangement. The insert 142 may have a second side, that has a second size such that it can be configured to abut against a post of a different size. For example, the second side of the insert 142 may be shaped so as to abut a post size of approximately 90 mm to 170 mm. In another example, the second side of the insert 142 may be shaped so as to abut a post size of approximately 118 mm to 198 mm. In another example, the second side of the insert 142 may be shaped so as to abut a post size of approximately 150 mm to 240 mm. However, in other examples, the second side of the insert 142 may be shaped so as to abut a post of any size. For example, the post could have an orthogonal cross-section.

The insert 142 is configured to be located between the post adapter 102 and said post. The insert 142 may include a first, substantially convex, side configured to abut the first side of the post adapter; and a second substantially concave side configured to abut said post, wherein the first side and second sides of the insert have different curvatures.

In other words, the strapping apparatus 100 is able to fit posts of various different sizes. Further, the strapping apparatus 100 can be retrofitted to existing posts without any modifications of the posts being required.

In the example shown in FIG. 3b, the insert 142 comprises an attachment 144 that is configured to couple with the insert attachment point 124 of the post adapter 102.

The insert 142 may be made of an adaptive material, which has a relatively high abrasive value so as to assist with the coupling between the insert 142 and the post, in use.

Figure 4:
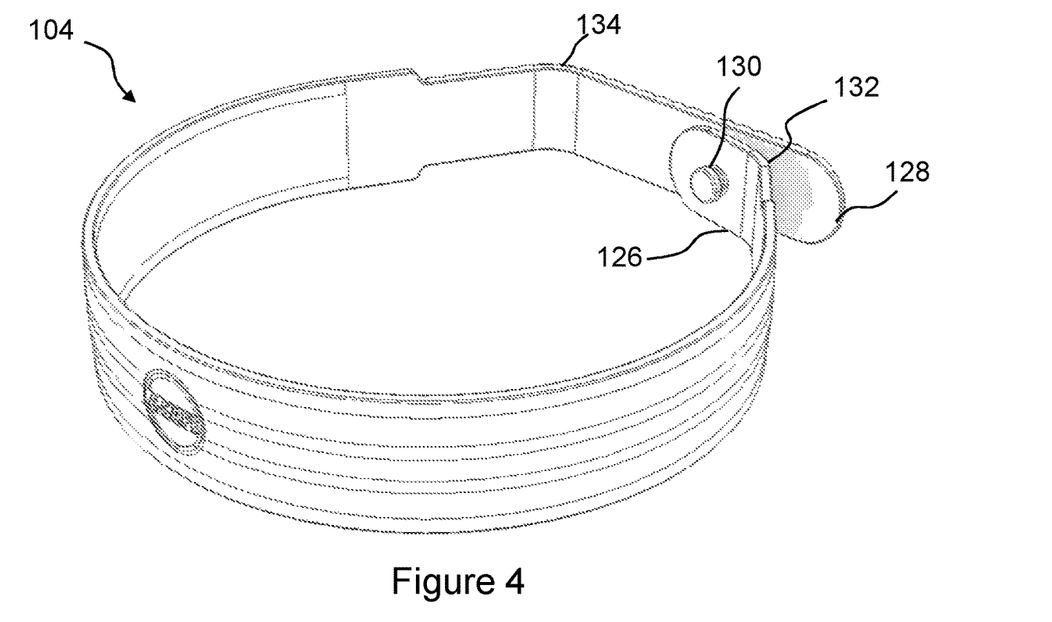
FIG. 4 shows an example of a strap.

FIG. 4 shows an example of a strap 104. As discussed above, the strap 104 includes a first end 126 and a second end 128. FIG. 4 shows the projection 130 located towards a first end 126 of the strap 104. The projection 130 is described above and comprises a head and a neck portion. The size of the head is larger than the size of the neck. The projection 130 is configured to be received in a fixture location, such as the slotted opening 122 of the catch 120 of the post adapter 102 to removably attach the strap 102 to the post adapter 102. The arrangement of the projection 130 and the slotted opening 122 mean that the strap 104 can be coupled to the post adapter 102 without any further attachments. In one example, the first end of the strap 104 may engage with the catch 120 in a removable engagement.

The strap 104 may comprise a first bend 132 towards the first end 126 of the strap 104. The first bend 132 enables the first end 126 of the strap 104 to be angled relative to the rest of the strap 104 such that it abuts the catch 120.

The strap 104 may also include a second bend 134 towards the second end 128 of the strap 104. In other examples, the strap 104 does not have a first bend 132 or a second bend 134, but merely has a rounded shape.

In one example, the strap 104 is formed of a flexible material to enable it to be strapped around the post, in use.

In this example, one or more ridges 136 are shown towards the second end 128 of the strap 104.

The strap 104 is configured to provide a frictional support between the post adapter 102 and the post. In other words, as an article, such as a barrier is rotated about the post, the strap 104 is configured to be fixed relative to the post.

In one example, the strap 104 comprises a twin shot material, for example, is made from a twin-shot injection moulded to provide the desired properties. In other words, the strap 104 is designed to provide the strength and friction to enable the article to be mounted on the post.

In one example, the strap 104 may have one or more ridges or protrusions in order to improve the grip between the strap 104 and the post. The strap 104 may have a friction coating in order to improve the friction between the strap 104 and the post.

Figure 5A:
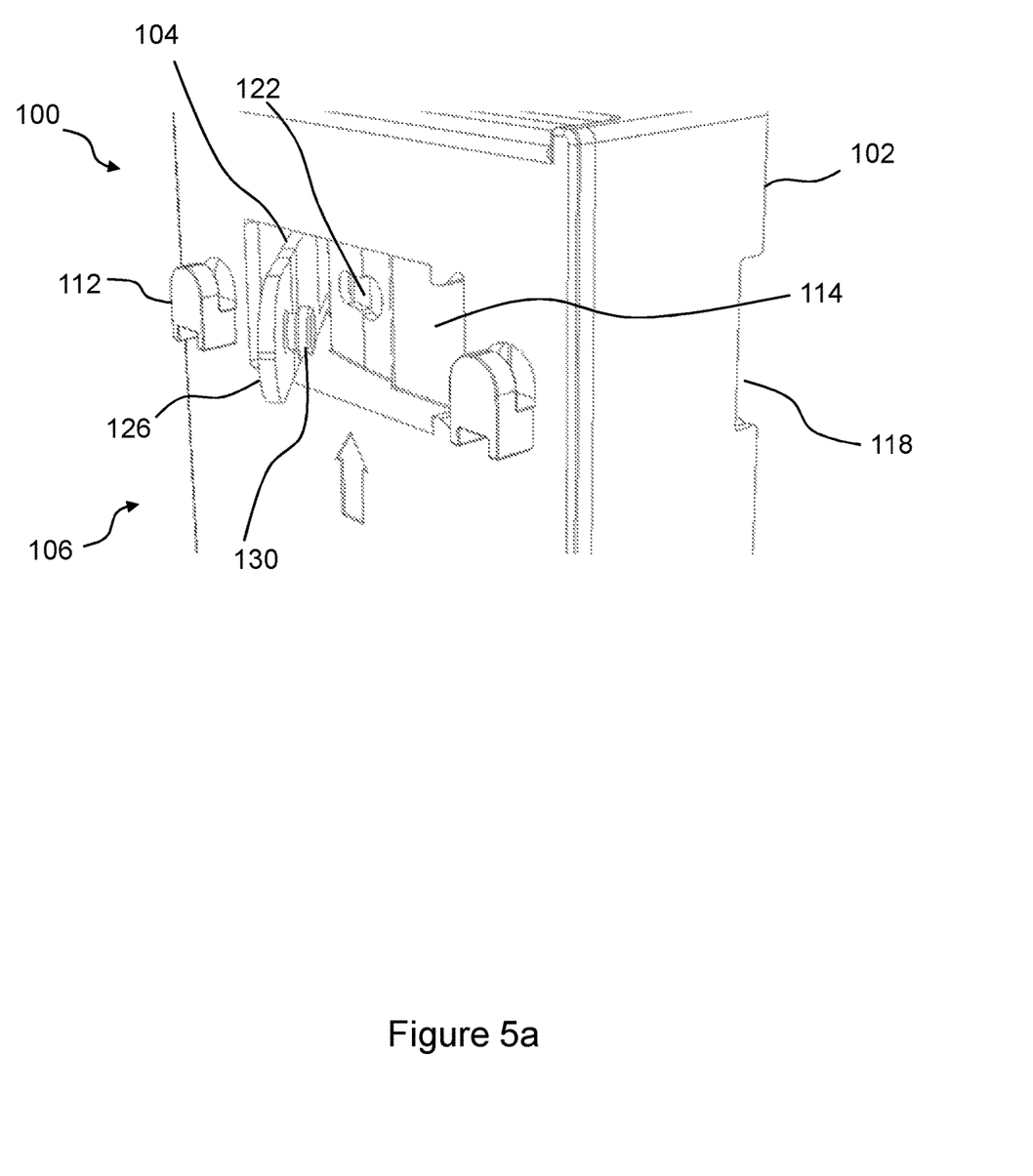
FIG. 5*a* shows an example of a strapping apparatus in which the first end of the strap is not engaged with the post adaptor.

FIG. 5a shows the first side 106 of the post adapter 102. In this example, the strap 104 is received in a channel 118 of the post adapter 102. In this figure, the first end 126 of the strap 104 is uncoupled from the catch 120. In other words, the projection 130 is not received in the slotted opening 122 of the catch 120.

Figure 5B:
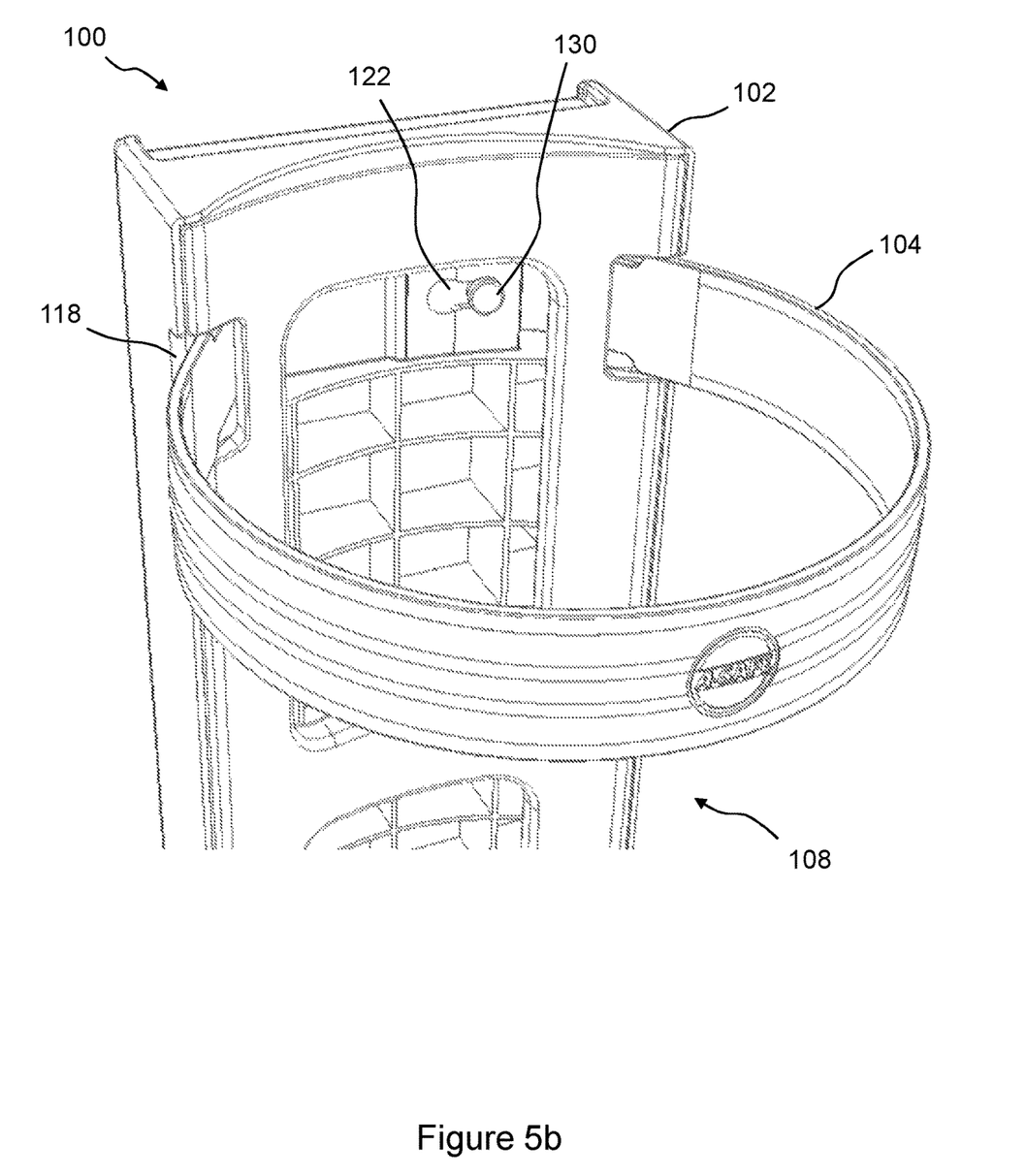
FIG. 5*b* shows an example of a strapping apparatus in which the first end of the strap is engaged with the post adaptor.

FIG. 5b shows the second side 108 of the post adapter 102. In this example, the strap 104 is received in a channel 118 of the post adapter 102. Further, the first end 126 of the strap 104 is coupled with the catch 120. In other words, the projection 130 is received in the slotted opening 122 of the catch 120.

Figure 6A:
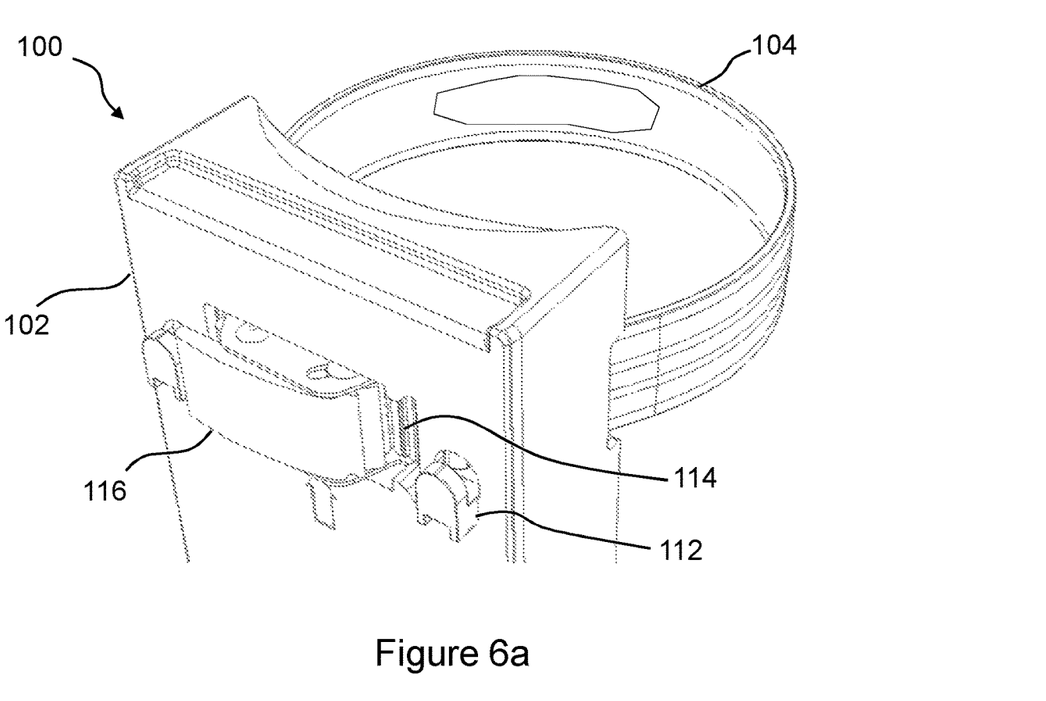
FIG. 6*a* shows an example of the strapping apparatus in which the second end of the strap is not received in the retaining element of the post adapter.

FIG. 6a shows an example of the strapping apparatus 100 in a different perspective. FIG. 6a shows an example of the retaining element 116 that is configured to removably couple with the second end 128 of the strap 104. The retaining element 116 is received in the recess 114 of the post adapter 102.

Figure 6B:
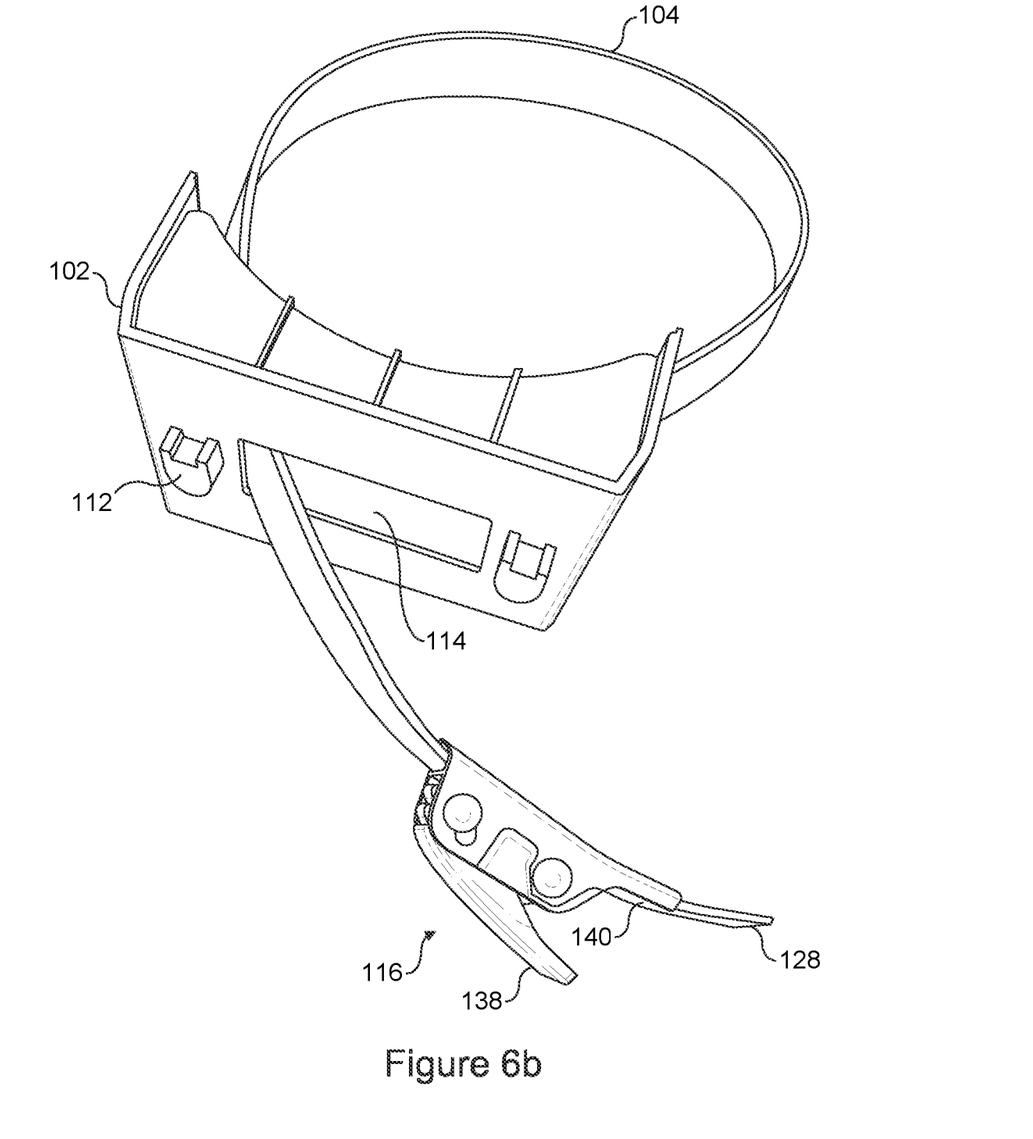
FIG. 6b shows an example of the strapping apparatus in which the second end of the strap is received in the retaining element of the post adapter.

FIG. 6b shows an example of the strapping apparatus 100 in which the second end 128 of the strap 104 is received in the retaining element 116. In this example, the retaining element 116 is not received in the recess 114.

In the example shown in FIGS. 6a and 6b, the retaining element 116 comprises a channel and a latch 138. The latch 138 is configured to move from a first position to a second position. In one example, the first position is an open position in which the channel is substantially open and the strap 104 can be received in the retaining element 116 and move relative to the retaining element 116.

In other words, the retaining element 116 comprises a latch 138 configured to engage with the one or more ridges of the strap 104. The retaining element 116 may be a buckle.

In one example, the second position is a closed position in which the channel is substantially closed and the strap 104 can be retained or resiliently held in the retaining element 116. In one example, the latch 138 may have a substantially cam shaped region that is configured to engage with the ridges 136 of the second end 128 of the strap 104. In other words, the retaining element 116 acts as a ratchet and engages with one or more ridges 136 of the strap 104. The latch 138 of the retaining element 116 may be ratcheted such that it tightens the strap 104. In use, a user can ratchet the latch 138 until it can't be tightened further to ensure that the strap 104 is sufficiently tensioned to hold the strapping apparatus 100 and barrier 146 in place.

As seen in FIG. 6b, the retaining element comprises a retaining portion 140. The retaining portion 140 is configured to engage with a complimentary shaped retaining portion of the post adapter 102 so that, in use, the retaining element 116 may be held within the recess 114. The recess 114 may include an opening or slot that is complimentary shaped with the retaining portion 140 so as to removably hold the retaining portion 140, in use.

As such, when the second end 128 of the strap 104 is received in the retaining element 116, and the retaining element is received in the recess 114 of the post adapter 102, both the first end 126 and the second end 128 of the strap 104 is removably coupled with the post adapter 102. If the straps 104 are strapped around a post or other fixture, then the post adapter 102 will be held in place. However, as the first end 126 of the strap 104 and the second end 128 of the strap 104 are removably coupled with the post adapter 102, then a user can easily decouple these and so a barrier can be easily taken down and re-erected in another location.

As the second end 128 of the strap 104 is received in the recess 114, then the retaining element does not extend beyond the limits of the recess 114. That is to say, the retaining element 116 may be entirely received in the recess 114 such that no part of the retaining element 116 projects from the recess 114. In this example, there is less chance that the latch 138 of the retaining element 116 will become caught or accidentally opened in practice.

Figure 7:
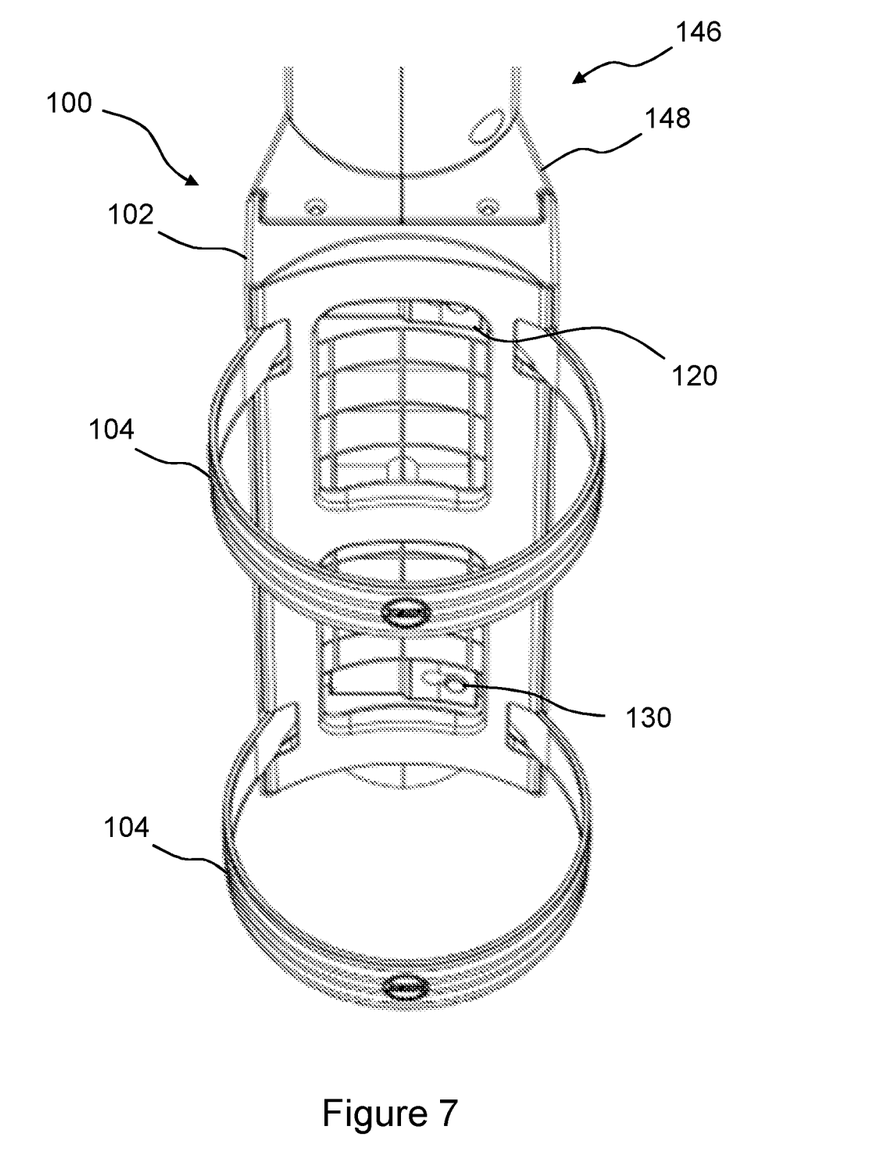
FIG. 7 shows an example of the strapping apparatus coupled to part of an article.

FIG. 7 shows an example of the strapping apparatus 100 coupled with an article 146, such as a barrier. For clarity, the post is not shown in FIG. 7, but the straps 104 are shaped such that they would extend around a post, in practice.

The article 146 may be coupled with the second side 108 of the strapping apparatus 100. For example, the strapping apparatus 100 may be coupled to the article 146 via the one or more coupling points 112 of the post adaptor 102, which may be coupled to corresponding coupling points on the article 146. In one example, the coupling points 112 comprise one or more hooks configured to receive corresponding openings or hooks of the barrier 146 to hold the article 146 to the post adaptor 102. In other words, the post adapter 102 includes an interface configured to support the article 146.

In this example, the article 146 would effectively cover the recess 114, which houses the retaining element 116 such that, in use, the retaining element 116 would be prevented from being accidently knocked from the second, closed position to the first, open position.

In the example shown in FIG. 7, the article 146 may comprise a hinge 148 that is directly coupled to the post adapter 102 to enable the article 146 to rotate relative to the post, in use.

The article 146 may comprises a barrier or gate to prevent a user form accessing an area. However, in other examples, the article 146 may be a dispenser or other apparatus that would be suitable for mounting to a post. For example, the article 146 may comprise goggles or a gloves dispenser for users requiring these items. In other examples, the article 146 may comprise an electrical box, safety signs, electronics, lights and/or a tool holder. The strapping apparatus 100 provides a versatile and easy means for allowing a user to fix various different articles 146 to a post.

Given the versatile nature of the apparatus, the strapping apparatus could be quickly and easily moved from a first position to a second position, as required.

As shown in FIG. 7, the projection 130 of the first end 126 of the strap 104 is received in the slotted opening 122 of the catch 120. The second end 128 of the strap 104 is received in the retaining element 116 (not shown). In this example, there is no permanent additional fixtures and a user may use the strapping apparatus 100 to couple a barrier 146 to a post, in a secure, removable fashion. That is to say, that the user can easily remove the barrier 146 from the post without difficulty and without having to use additional fixing means. This increases the usability of the post adapter 100.

Figure 8:
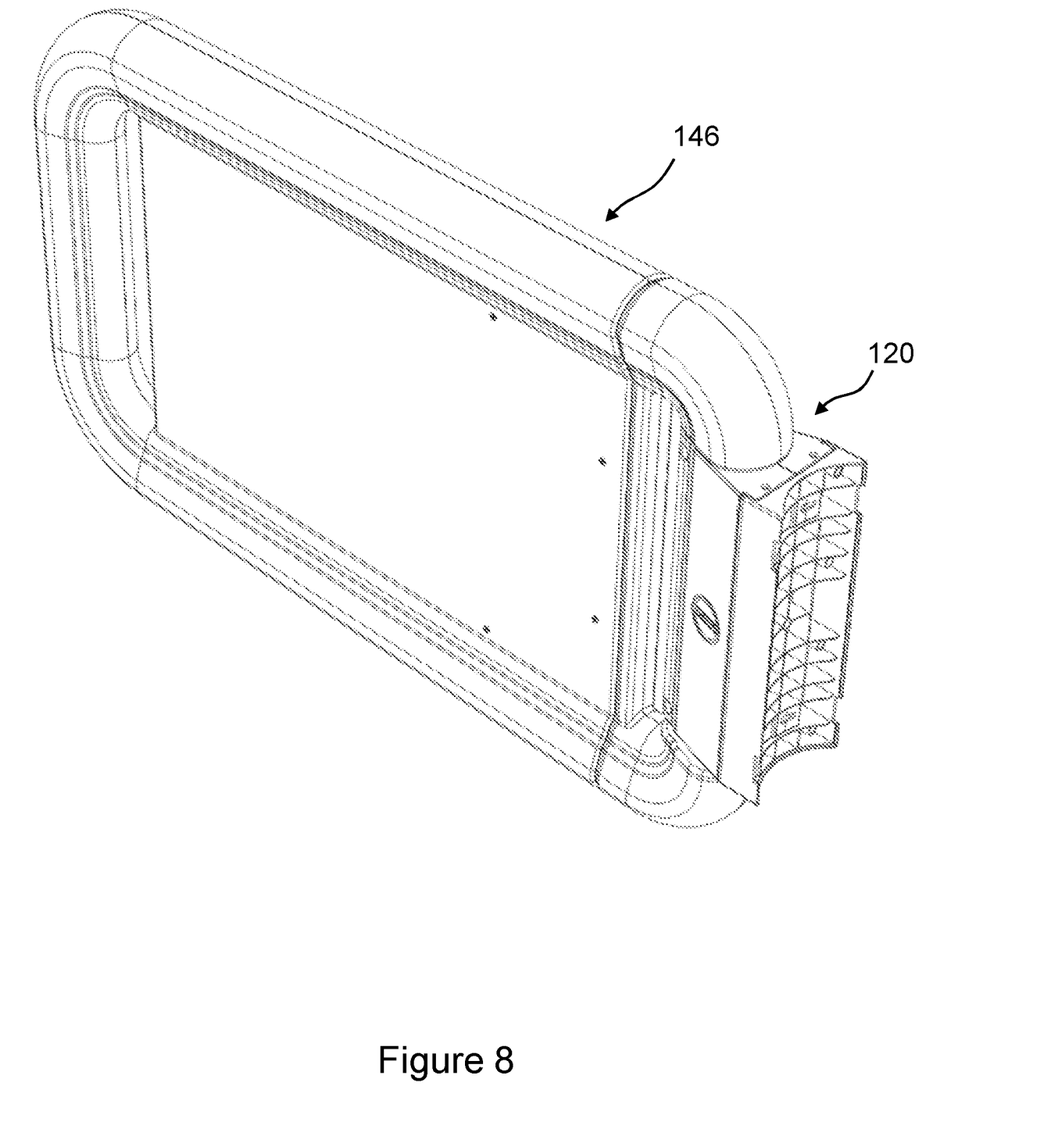
FIG. 8 shows an example of the strapping apparatus coupled to a barrier.

FIG. 8 shows an example in which the post adaptor 102 is coupled to the barrier, in use.

In one example, there is provided a barrier system. The barrier system includes a barrier member 146 and a post adapter 102 configured to engage with the barrier member 146 and a post. The post adapter 102 comprises a strap 104 configured to extend around a post to couple the barrier system to the post.

Figure 9:
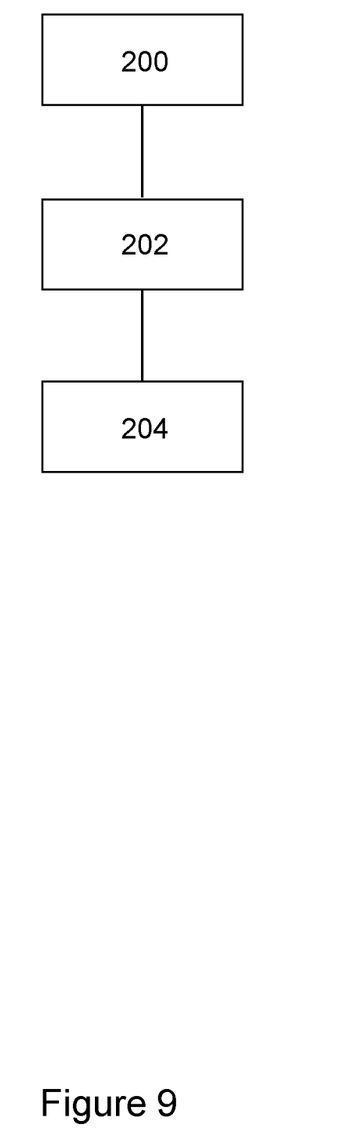
FIG. 9 shows an example of the method of attaching the strapping apparatus to a post.

FIG. 9 shows an example of the method for attaching a strapping apparatus to a post. At 200, the method includes the step of removably coupling a first end 126 of a strap 104 to a fixture location in a recess of a post adapter 102.

At 202, the method includes the step of strapping the strap 104 around the post and placing the second end 128 of the strap 104 into a retaining element 116 in the recess 114 of the post adapter 102.

At 204, the method includes the optional step of coupling a barrier 146 to the post adapter 102, wherein the barrier 146 substantially covers the retaining element 116 in the recess 114 of the post adapter 102.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A strapping apparatus for coupling an article to a post, the apparatus comprising:
   a post adapter comprising a substantially concave first side configured to engage with the post and a second side comprising a recess and one or more coupling points;
   a retaining element at least partially located in the recess of the post adapter;
   a strap configured to extend around the post, the strap comprising:
      a first end configured to be removably coupled to the post adapter; and
      a second end configured to be received in the retaining element; and
   an insert located between the post adapter and the post, the insert comprising:
      a first substantially convex side configured to abut the first side of the post adapter; and
      a second substantially concave side configured to abut the post,
      wherein the first side and the second side of the insert have different curvatures,
   wherein in use, the retaining element in the recess of the post adapter is configured to be substantially covered by the article.

2. The strapping apparatus according to claim 1, wherein the first end of the strap is removably coupled to a fixture location in the recess of the post adapter.

3. The strapping apparatus according to claim 1, wherein the first end of the strap comprises a protrusion configured to be received in a slotted channel in a catch of the post adapter.

4. The strapping apparatus according to claim 1, wherein the retaining element comprises a buckle.

5. The strapping apparatus according to claim 4, wherein the buckle comprises a retaining portion configured to be received in a complimentary shaped portion of the recess of the post adapter.

6. The strapping apparatus according to claim 1, wherein the second end of the strap comprises one or more ridges.

7. The strapping apparatus according to claim 6, wherein the retaining element comprises a latch configured to engage with the one or more ridges of the strap.

8. The strapping apparatus according to claim 1, wherein the strap comprises a twin shot material.

9. The strapping apparatus according to claim 1, comprising a plurality of straps.

10. A system comprising:
the strapping apparatus according to claim 1; and
the article configured to substantially cover the retaining element in the recess of the post adapter.

11. The system according to claim 10, wherein the article comprises a barrier member.

12. A method of attaching the strapping apparatus of claim 1 to the post, the method comprising:
removably coupling the first end of the strap to a fixture location in the recess of the post adapter;
strapping the strap around the post and placing the second end of the strap into the retaining element; and
coupling the article to the one or more coupling points of the post adapter configured to support the article,
wherein the article substantially covers the retaining element in the recess of the post adapter.

* * * * *